United States Patent [19]

Takahashi et al.

[11] Patent Number: 5,337,075
[45] Date of Patent: Aug. 9, 1994

[54] IMAGE FORMING APPARATUS CAPABLE OF READILY CHANGING THE PIXEL DENSITY OF AN IMAGE

[75] Inventors: Tomoko Takahashi, Yokohama; Hisashi Shoji, Kawasaki, both of Japan

[73] Assignee: Ricoh Company, Ltd., Tokyo, Japan

[21] Appl. No.: 845,590

[22] Filed: Mar. 4, 1992

[30] Foreign Application Priority Data

Mar. 4, 1991 [JP] Japan .................................. 3-037309

[51] Int. Cl.⁵ ............................................. B41J 2/435
[52] U.S. Cl. .................................. 346/107 R; 346/154; 358/298
[58] Field of Search ............. 346/107 R, 154; 358/298, 300; 395/104, 108, 109, 115, 128

[56] References Cited

U.S. PATENT DOCUMENTS

| 4,074,319 | 2/1978 | Goldschmidt et al. | 358/302 X |
| 4,531,160 | 7/1985 | Ehn | 358/298 X |
| 4,596,995 | 6/1986 | Yamakawa et al. | 346/160 |
| 4,814,886 | 3/1989 | Kuge et al. | 358/298 X |
| 4,843,408 | 6/1989 | Tanaka | 358/298 |
| 4,882,686 | 11/1989 | Gretter | 346/107 R X |
| 5,055,855 | 10/1991 | Nishio | 346/107 R X |
| 5,105,202 | 4/1992 | Hewes | 346/107 R X |

FOREIGN PATENT DOCUMENTS 01311769 12/1989 Japan .

Primary Examiner—Benjamin R. Fuller
Assistant Examiner—David Yockey
Attorney, Agent, or Firm—Oblon, Spivak, McClelland, Maier & Neustadt

[57] ABSTRACT

An image forming apparatus capable of readily changing the pixel density of an image to be formed on an image carrier and, therefore, stabilizing image reproduction. To change the pixel density, the apparatus turns on, among light emitting elements arranged in a higher density than input image data, a plurality of light emitting elements per pixel or by changing the number of light emitting elements per pixel and the turn-on time thereof.

1 Claim, 7 Drawing Sheets

IMAGE FORMING APPARATUS CAPABLE OF READILY CHANGING THE PIXEL DENSITY OF AN IMAGE

BACKGROUND OF THE INVENTION

The present invention relates to a digital image forming apparatus for forming an image on an image carrier in response to input image data.

One of conventional digital copiers, printers or similar image forming apparatuses generates image data to be written in response to image data sent from an input device, exposes the precharged surface of a photoconductive element, or image carrier, on the basis of the image data to electrostatically form a latent image, and develops the latent image by a toner. This type of apparatus often uses a light emitting diode (LED) array as means for exposing the photoconductive element. An LED array implements high-speed printing and broad-width printing, compared to laser optics which scans a photoconductive element by a single laser beam. Further, since the LED array extends in the main scanning direction, it insures high positional accuracy in the main scanning direction on the photoconductive element.

In parallel with the spread of digital image forming apparatuses, there is an increasing demand for high image quality in the total sense. There is also a keen demand for outputting methods each matching a particular kind of image due to the diversifying input system and diversifying document image. One conventional approach for meeting such demands is to change the pixel density of an image to be written in the photoconductive element by the exposing means. Laser optics, for example, changes the pixel density of an image by reducing the spot size of the laser beam and subjecting the laser beam to various kinds of modulation. However, since laser optics forms an image by manipulating a single beam, it cannot change the pixel density unless the construction thereof is drastically changed. Moreover, it is difficult with such laser optics to control the writing position on the photoconductive element. Laser optics with a special configuration would increase the size and cost of the entire apparatus.

SUMMARY OF THE INVENTION

It is, therefore, an object of the present invention to provide an image forming apparatus capable of readily changing the pixel density of an image to be formed on an image carrier, thereby insuring stable image reproduction.

In accordance with the present invention, an image forming apparatus for forming an image on an image carrier in response to input image data includes an exposing section having an array of light emitting elements which are arranged in a main scanning direction of the image carrier for exposing the image carrier in response to the input image data. The light emitting elements are arranged in a higher density than the pixel density of the input image data. A controller controls the exposing section such that, among the light emitting elements, a plurality of light emitting elements are turned on per pixel of the input image data.

Also in accordance with the present invention, an image forming apparatus for forming an image on an image carrier in response to input image data includes an exposing section having an array of light emitting elements arranged in a main scanning direction of the image carrier for exposing the image carrier in response to the input image data. The light emitting elements are arranged in a higher density than the pixel density of the input image data. A controller controls the exposing section such that the number of light emitting elements per pixel of the input image data and the turn-on time of the light emitting elements are changed in response to a change in the pixel density of the input image data.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
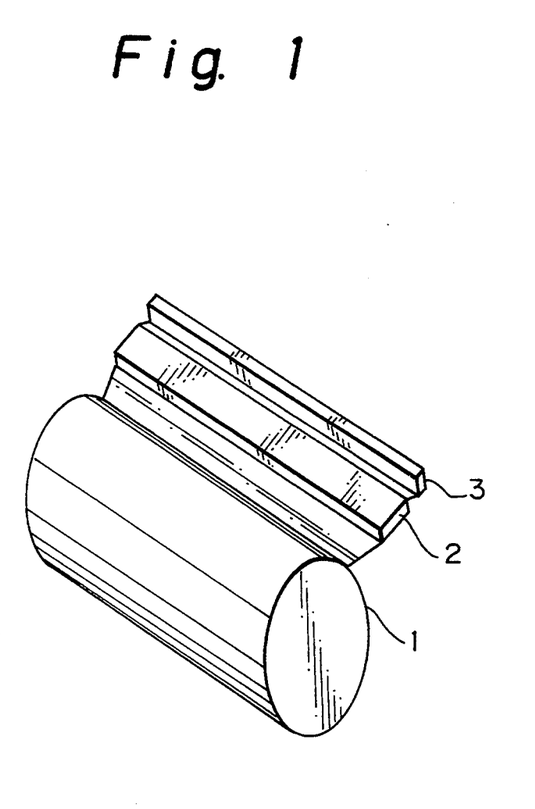
FIG. 1 is a perspective view of an exposing section included in an image forming apparatus embodying the present invention.

Referring to FIG. 1 of the drawings, an image forming apparatus embodying the present invention, particularly an exposing section thereof, is shown. As shown, the exposing section includes a photoconductive element, or image carrier, in the form of a drum 1. Light issuing from an array of LEDs 3 scans the surface of the drum 1 via a focusing device 2. Specifically, the LED array 3 emits light on the basis of image data to be written and derived from image data received from an input device, not shown. The surface of the drum 1 is charged to a predetermined polarity by charging means, not shown, beforehand. As a result, a latent image associated with the image data is electrostatically formed on the drum 1. The latent image is developed by a toner, then transferred to a paper sheet, and then fixed on the paper sheet by conventional units for implementing an image forming process.

Figure 2:
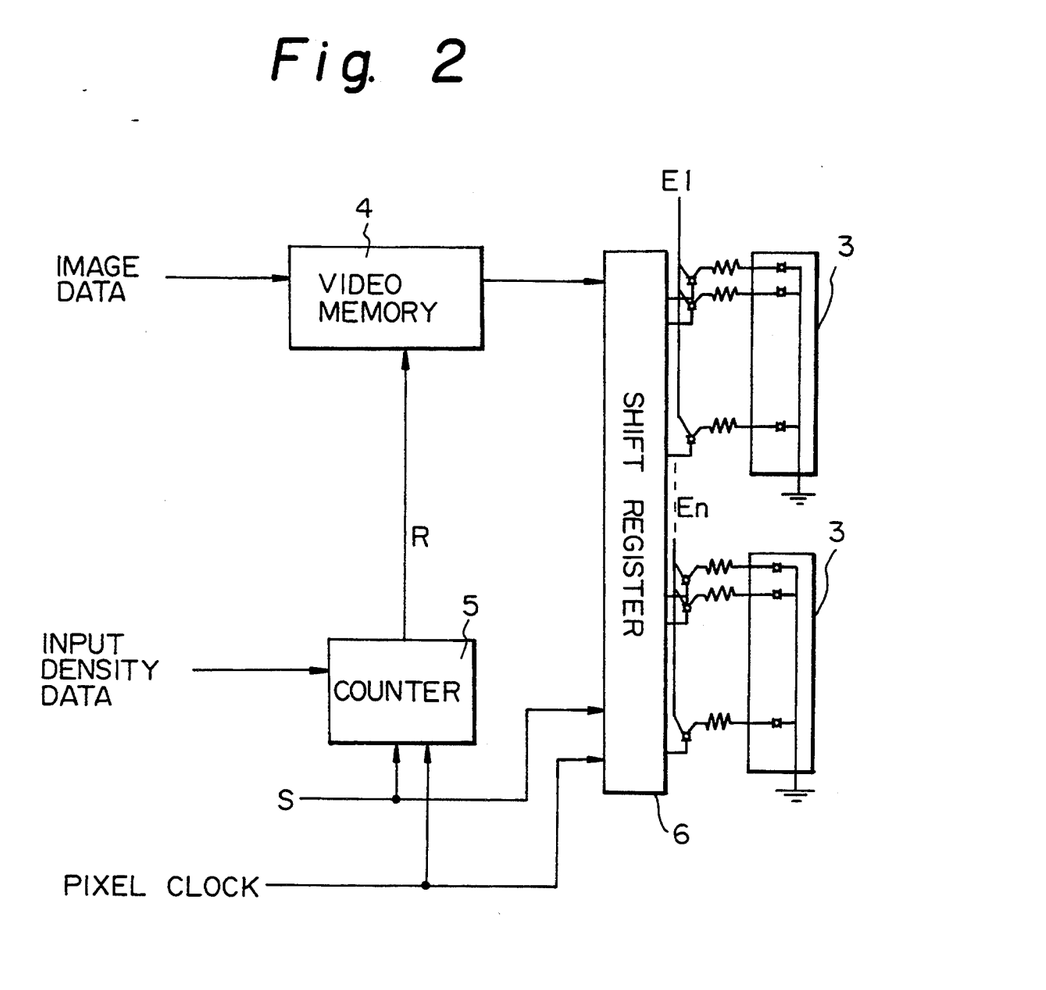
FIG. 2 is a circuit diagram showing a specific construction of circuitry for turning on an LED array included in the embodiment.

FIG. 2 shows a specific circuit arrangement for selectively turning on the LEDs of the LED array 3. Image data sent from an image input device, not shown, is stored in a video memory 4 via an image processing section, not shown. A pixel clock is applied to a counter 5 and a shift register 6. In response to the pixel clock, the counter 5 generates a reset signal R in matching relation to input density data representative of the density of image data and the density of the LED array 3. Assume that the LED array 3 has a density of 1,200 dots per inch (dpi) while the image data to be written has a pixel density of 400 dpi. Then, the counter 5 feeds the reset signal R to the video memory 4 in response to every three clock pulses. On receiving the reset signal R, the video memory 4 updates the image data stored therein and maintains the previous output until it receives the next reset signal R. On the other hand, the same data is applied to the shift register 6 three pixels at a time, because the shift register 6 receives data from the video memory 4 according to the pixel clock. As soon as the shift register 6 receives all the image data, it begins to output them. A power source current En is applied to a current amplifying section in association with a turn-on time. The turn-on time is a period of time associated with one dot in the circumferential direction of the drum 1. In this embodiment, a turn-on time three times as long as the turn-on time for 1,200 dpi constitutes one unit. A turn-on time determining section, not shown, determines a turn-on time and current ON/OFF timings on the basis of the pixel density of image data.

Figure 3:
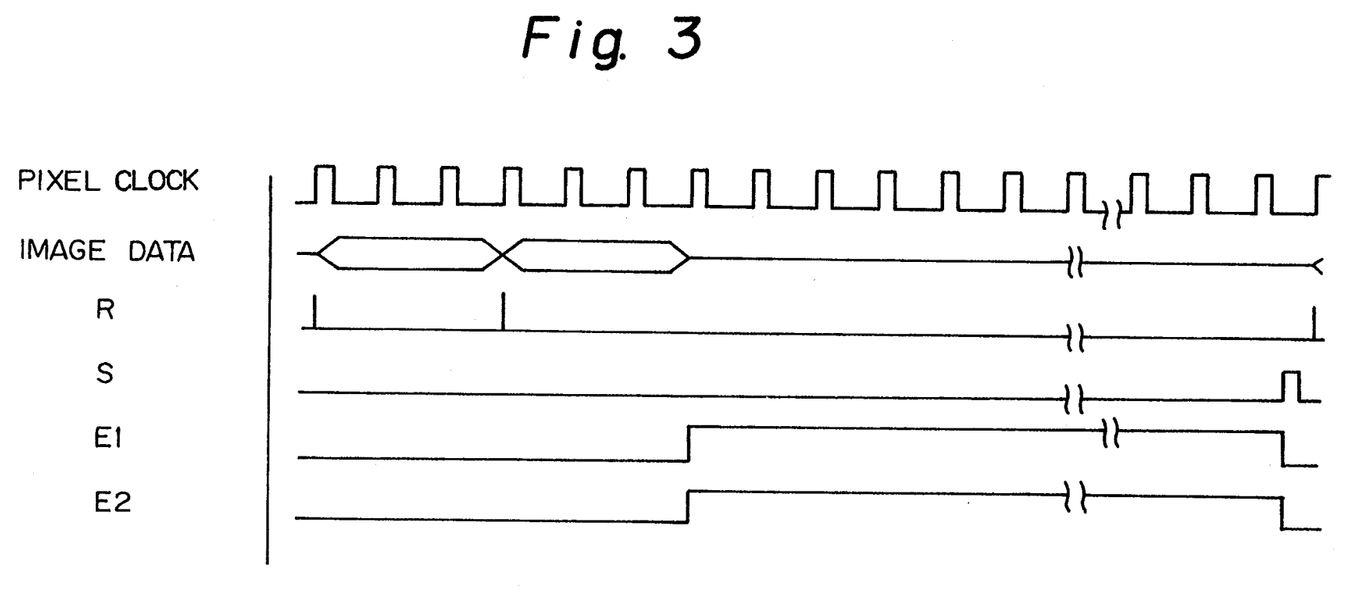
FIG. 3 is a timing chart demonstrating the operation of the circuitry shown in FIG. 2.

FIG. 3 is a timing chart demonstrating the operation of the above-described specific circuitry. The density of the LED array 3 and that of image data are assumed to be 1,200 dpi and 400 dpi, respectively, as stated earlier. In response to the pixel clock, the counter 5 generates a timing for updating image data. Specifically, on receiving the pixel clock three times, the counter 5 feeds an update signal to the video memory 4 with the result that the image data is updated, as illustrated. The shift register 6 stores M serial data and outputs them in parallel. When all the M data are written to the shift register 6, the LED array 3 starts scanning the drum 1 and turns off in response to a signal S which is sent thereto from a write timer, not shown. The write timer sets a period of time associated with the density of 400 dpi, i.e., a period of time three times longer than the period of time associated with the density of 1,200 dpi.

Figure 4:
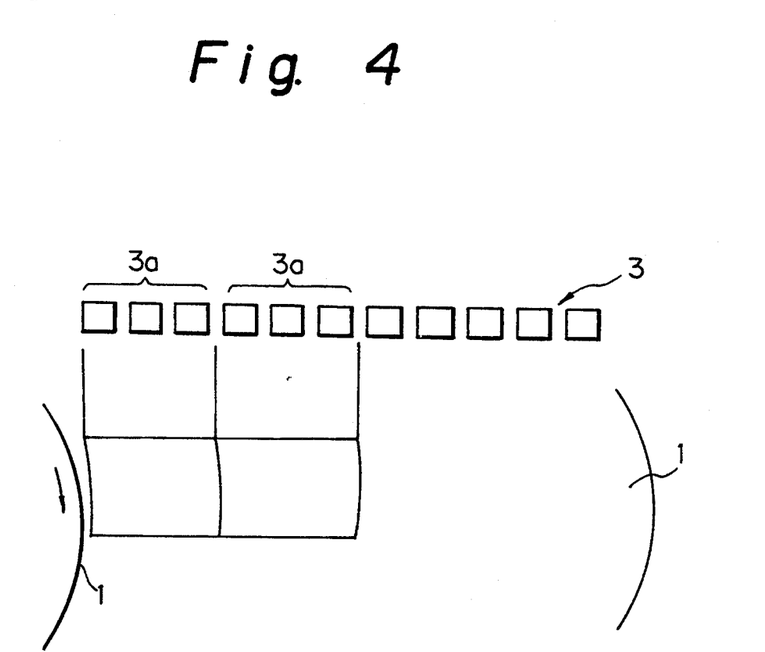
FIG. 4 indicates the correspondence of the density of the LED array and one pixel of input image data.

FIG. 4 indicates how an image is formed when the pixel density of image data and the density of the LED array 3 are 400 dpi and 1,200 dpi, respectively. As shown, three LEDs 3a are assigned to each pixel of image data in the main scanning direction. In the circumferential direction of the drum 1, each LED 3a is turned on for a period of time corresponding to one pixel and three times as long as the period of time for 1,200 dpi. As a result, each group of three LEDs 3a substantially covers one dot.

Figure 5A:
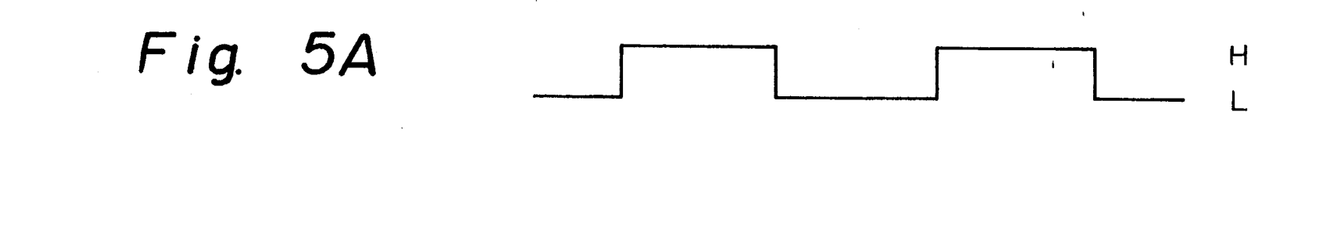
FIGS. 5A, 5B and 5C show how a latent image is formed on a photoconductive element.
Figure 5B:
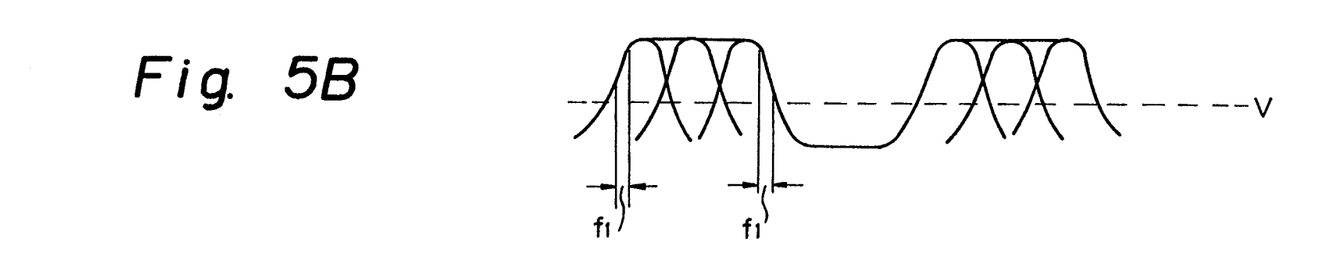
Figure 5C:
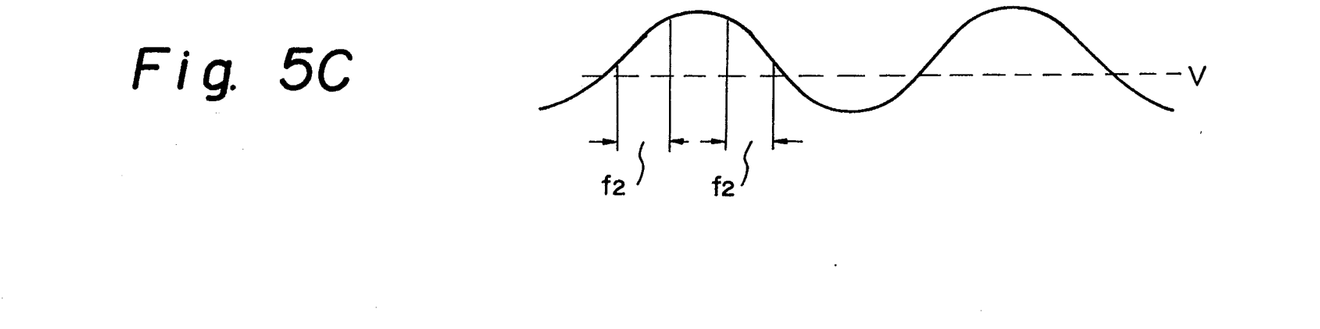

A reference will be made to FIGS. 5A, 5B and 5C for describing latent images which may be formed on the drum 1. Specifically, FIG. 5A indicates the variation of a writing signal with respect to time; "H" and "L" are representative of an image portion and a non-image portion, respectively. FIG. 5B shows the surface potentials of the drum 1 derived from the writing signal and particular to the embodiment wherein the LED pitch is 1,200 dpi. FIG. 5C shows surface potentials resulting from an ordinary laser beam. As shown, the ordinary laser beam causes the image density to sharply change relative to the surface potential V of the drum 1 over a broad potential range $f_2$ (centering around about one half of the maximum potential) in which halftone appears. By contrast, the illustrative embodiment reduces such a potential range to $f_1$. Moreover, the embodiment sets up a substantially uniform potential in the central area of an image. Hence, with the embodiment, it is possible to reproduce an image extremely stably by development, transfer, and fixation.

Figure 6:
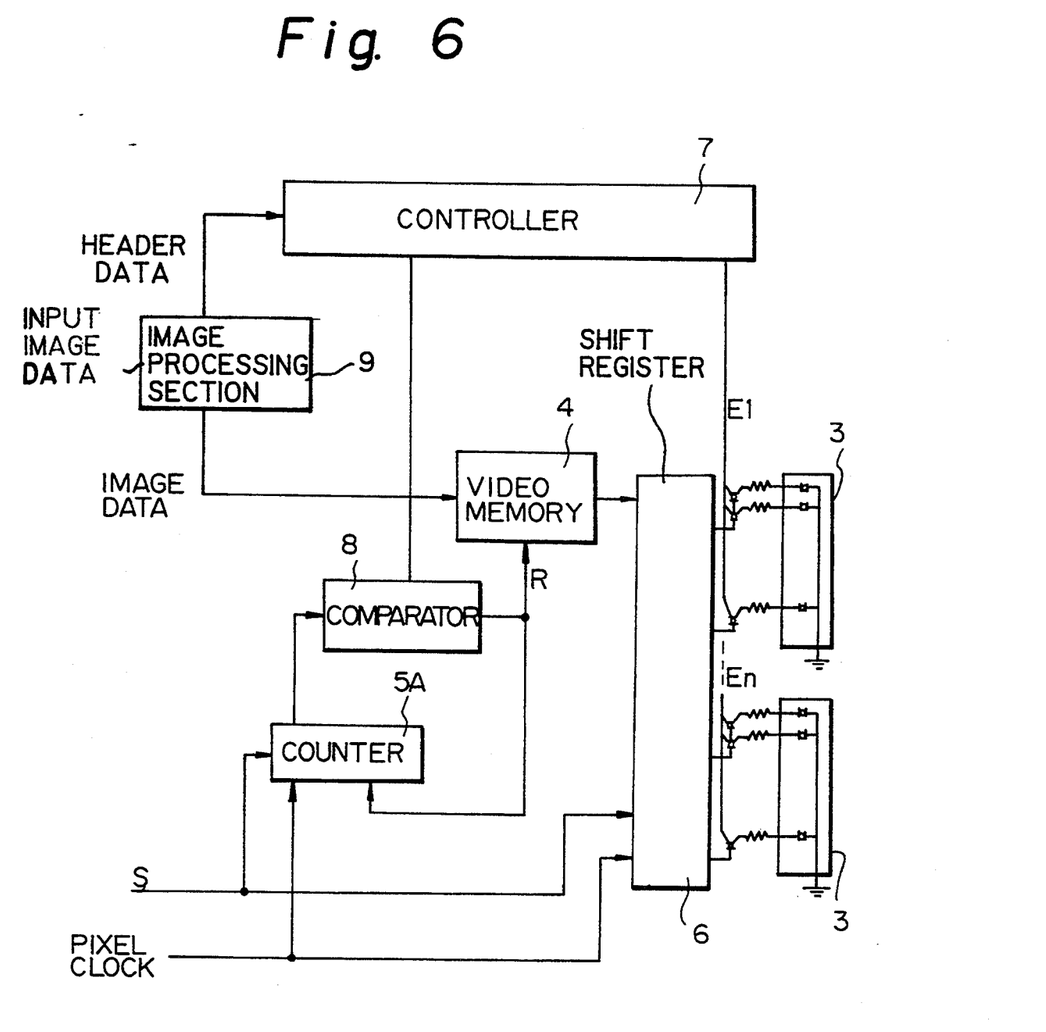
FIG. 6 is a circuit diagram showing another specific construction of the circuitry for turning on the LED array.
Figure 7:
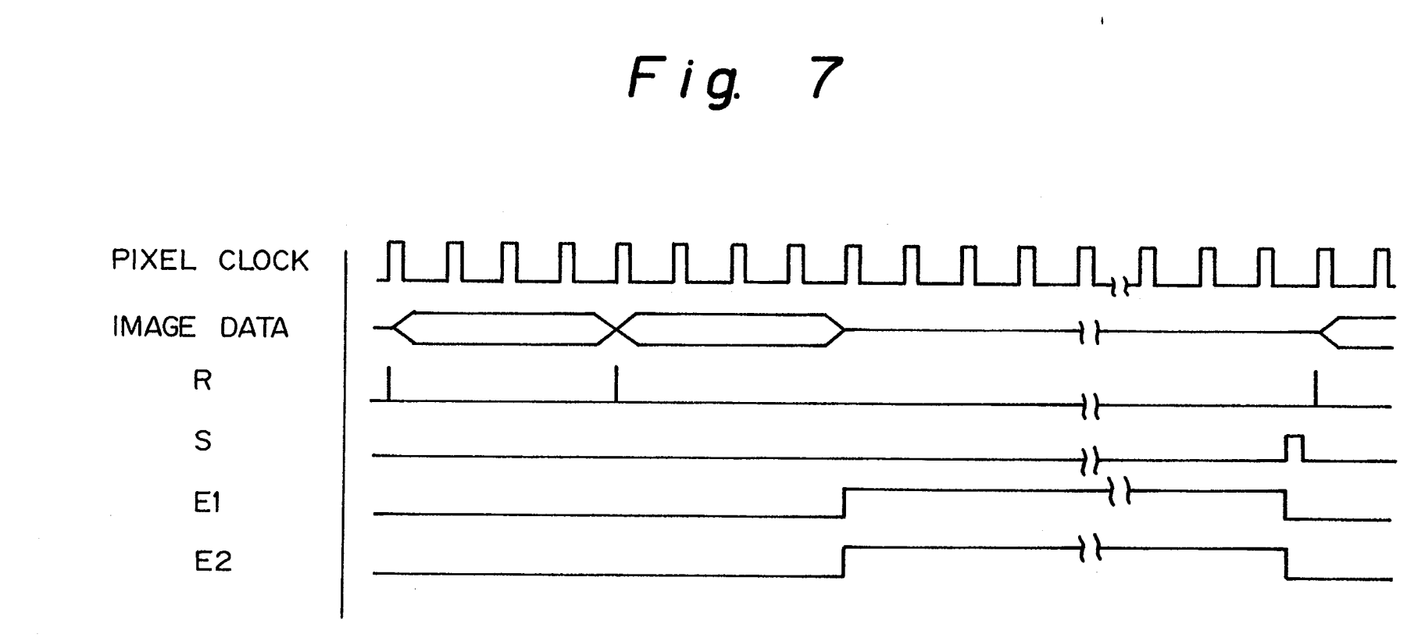
FIG. 7 is a timing chart demonstrating the operation of the circuitry shown in FIG. 6.

FIG. 6 shows another specific circuitry for selectively turning on the LEDs of the LED array 3. Image data is sent from an external device, not shown, and provided with a header, not shown, representative of the pixel density thereof. A pixel density determining section, not shown, is included in an image processing section 9 to identify the header data and transfers it to a controller 7. In response, the controller 7 delivers a signal matching the pixel density to a comparator 8. A pixel clock is applied to the shift register 6 and a counter 5A. The counter 5A counts the pixel clock while feeding the count thereof to the comparator 8. The comparator 8 compares the pixel density signal from the controller 7 and the count from the counter 5A and, when they coincide, sends a reset signal to the video memory 4. At the same time, the reset signal is applied to the counter 5A to reset or initialize it. In this example, the LED density is also 1,200 dpi. Therefore, if the pixel density of image data is 300 dpi, for example, the controller 7 delivers "4" to the comparator 8. As a result, the video memory 4 updates image data once per four pixel clock pulses while holding the previous state during the interval between updating operations. The turn-on time is determined by the ON/OFF timing of the power source current En which is fed to the current amplifying section. This ON/OFF timing is, in turn, determined by the controller 7 on the basis of the header data accompanying the image data. FIG. 7 indicates the operation of the circuitry shown in FIG. 6. Further, when the LED pixel density is 1,200 dpi, the controller 7 feeds "5" to the comparator 8 if the pixel density of image data is 240 dpi or feeds "2" if it is 600 dpi. In this manner, this circuitry is capable of changing the writing density simply by changing the signal. While the information representative of the pixel density of image data is implemented by header data accompanying image data, it may alternatively be entered on keys by the operator or may be produced on the basis of the frequency components of an image read by a scanner.

In summary, it will be seen that the present invention provides an image forming apparatus capable of changing the pixel density simply by turning on, among light emitting elements arranged in a higher density than input image data, a plurality of light emitting elements per pixel. When the light emitting unit is so subdivided, the range in which halftone appears is reduced to stabilize image reproduction.

Further, when the pixel density of input image data is changed, the present invention can readily change the pixel density by changing the number of light emitting elements per pixel and the turn-on time thereof. This is also successful in stabilizing image reproduction.

Various modifications will become possible for those skilled in the art after receiving the teachings of the present disclosure without departing from the scope thereof.

What is claimed is:

1. An image forming apparatus for forming an image on an image carrier in response to input image data, having pixels and a pixel density comprising:
   exposing means comprising an array of light emitting elements arranged in a main scanning direction of said image carrier for exposing said image carrier in response to the input image data, said light emitting elements being arranged in a density higher than the pixel density of said input image data;
   control means for controlling said exposing means such that a number of said light emitting elements are turned on for each of said pixels of the input image data, wherein said number of said light emitting elements which are turned on for each pixel of input image data changes in response to a change in the pixel density of said input image data, and a turn-on time of said light emitting elements also changes in response to said change in the pixel density of said input image; and a processor means for processing said input image data;

wherein said control means comprises:
- a video memory storing said processed image data and receiving a reset signal as an input;
- a counter sequentially incrementing a count value in response to pixel clock pulses and for outputting the count value;
- a controller outputting a signal matching the pixel density of the input image data;
- a comparator comparing said signal from said controller and said count value of said counter and, when said signal and said count value coincide, feeding said reset signal to said video memory, wherein said video memory updates the image data upon receiving said reset signal; and
- a shift register receiving the processed image data from said video memory and outputting a signal for turning on said number of said light emitting elements for each of said pixels of the input image data.

* * * * *